United States Patent Office 3,216,827
Patented Nov. 9, 1965

3,216,827
MEAT PRODUCT WITH NON-SHRINK BINDER MATERIAL
Hugh J. Fetty, 4309 Alta Vista Lane, Dallas 29, Tex.
No Drawing. Filed Feb. 15, 1965, Ser. No. 432,901
15 Claims. (Cl. 99—108)

This application is a continuation-in-part of my co-pending application for patent Serial No. 222,615, filed September 10, 1962, entitled "Meat Product With Non-Shrink Binder Material," now abandoned.

This invention relates to improvements in the preparation of meats. In particular, it is directed to improvements especially suitable for the preparation of meat products such as ground meat and meat products, such as hamburger meat, sausage, lamb patties, frankfurters, bolognas, meat loaves, luncheon meats and the like.

In the preparation and cooking of ground meat and especially ground pork sausage, there has always been present the problem of extreme loss of natural meat juices and fats due to the normal shrinking characteristics of meat tissues when cooking is performed by heating for consumption.

This excessive loss of natural meat serums and fats always results in equal loss of meaty flavor and natural tenderness of comminuted ground meats when cooked.

Accordingly, a primary object of this invention is to provide means of retaining most of the natural fats when ground meats are cooked for eating.

A further object of this invention is to provide means of retaining most of the natural meat serum and moisture when ground meats are cooked for eating.

A further object of this invention is to provide means of improving the texture and eating quality of prepared meat.

A further object of this invention is to provide means of improving the natural flavors of ground meat by retaining more of the natural meat fats, meat serum and moisture.

A further object of this invention is to provide means of reducing the normal physical shrinking characteristic of meats when cooked, which reduces the physical forces that normally squeezes out the liquid and fat phase of the meats.

A further object of this invention is to provide means of improving the tenderness of the ground meat product due to less shrinking and less density of the cooked product.

A further object of this invention is to provide means of reducing normal shrinkage in proportion to the amount of non-shrink binder added to ground meat products.

The non-shrink binder material added to ground meat is composed of dicalcium phosphate dihydrate, sodium bicarbonate, and preferably a filler of structural material, such as a wheat flour, or other cereal type flours, and non-fat dried milk solids, or other type of colloids that forms a continuous phase when mixed with a non-structural forming material, such as ground meats. Other optional ingredients which may be mixed with the non-shrink binder material can be a meat flavor intensifier such as hydrolized vegetable protein or monosodium glutamate, and/or a small amount of monocalcium phosphate can be added with the dicalcium phosphate dihydrate in sufficient amount to neutralize the sodium bicarbonate to such an extent as to control the formation of carbon dioxide to prevent undesirable swelling of the meat product. It is desirable that the carbon dioxide formed and released by heating and reaction between the dicalcium phosphate and sodium bicarbonate be just sufficient to prevent the loss of fat and juices from the meat occasioned by cooking.

The percent of dicalcium phosphate dihydrate and monocalcium phosphate added should be of the proper ratio to neutralize the amount of sodium bicarbonate used in the meat additive composition.

Experimental work has indicated that 3% to 6% of the weight of the ground meat should be made up of the blended non-shrink binder material. The larger the percentage of the binder material added, the less shrinkage occurs when the blended ground meat and binder material is subjected to heat and cooked. The 6% by weight level of binder material reduces normal shrinkage of the ground meat when cooked for eating to an insignificant amount compared to shrinkage of ground meat without the non-shrink binder material.

The following is an example of the non-shrink binder composition made in accordance with the invention:

| | Parts by weight, pounds |
|---|---|
| Dicalcium phosphate dihydrate | 45.37 |
| Sodium bicarbonate | 15.10 |
| Wheat flour | 27.80 |
| Non-fat dried milk solids | 10.73 |
| Hydrolyzed vegetable protein | 1.00 |

If the non-fat dried milk and hydrolyzed vegetable protein are omitted, which may be done, the parts thereof may be added to the wheat flour or other filler.

The above ingredients are blended thoroughly and then added to ground meat in the following proportions:

| | Pounds |
|---|---|
| Ground meats | 100 |
| Non-shrink meat binder | 3 to 6 |

The non-shrink binder material is thoroughly blended with the ground meat. This can best be accomplished by addition after the first coarse grinding of the meat, then mixing in a mechanical blender before going through the final grinder. Another method is to add the non-shrink binder material with completely ground raw meats just prior to preparation for cooking.

When the meat with the non-shrink composition is subjected to normal baking or grilling, cooking temperature of 350° F. and above, the applied heat causes reaction between the dicalcium phosphate dihydrate and sodium bicarbonate to release carbon dioxide dispersed through the meat sufficient to prevent the loss of natural fats and other fluids by shrinkage. The filler material also absorbs sufficient of the natural fluids and fats to maintain flavor. Thus shrinkage is reduced to a minimum and flavor is maintained. The flavor intensifier, if added, also aids in flavor retention.

After cooking, the meat may be immediately served or it may be further processed for making luncheon meats, bologna, or the like.

Another example of the composition with the addition of monocalcium phosphate would be as follows:

| | Parts by weight, pounds |
|---|---|
| Dicalcium phosphate dihydrate | 43.57 |
| Monocalcium phosphate | 1.80 |
| Sodium bicarbonate | 15.10 |
| Wheat flour | 27.80 |
| Non-fat dried milk solids | 10.73 |
| Hydrolyzed vegetable protein | 1.00 |

The above ingredients are blended thoroughly and then added to ground meats, as hereinbefore described, as for example:

| | Pounds |
|---|---|
| Ground meats | 100 |
| Non-shrink meat binder | 3 to 6 |

The proportions of the ingredients of the non-shrink binder material may be varied within certain ranges and still accomplish the desired result.

For instance, the mixture may be in the proportions of between one-third and one-half dicalcium phosphate dihydrate, between one-third and one-half colloidal binder material, and between 10% and 20% of sodium bicarbonate.

The above indicated mixture may be mixed with ground meat in the proportion of 3% to 6% by weight of the ground meat.

The vegetable protein, if added to the non-shrink binder material, may be varied from 1% to 5% of the mixture; and monocalcium phosphate, if added to the non-shrink binder material, may vary from 1% to 5% of the mixture.

Sodium aluminum phosphate may be substituted for the dicalcium phosphate dihydrate in the mixtures described above, in the same proportions, to perform the function as a neutralizing agent for the sodium bicarbonate.

Having described my invention, I claim:

1. A non-shrink binder material for addition to ground meat comprised of:

| | Parts by weight, pounds |
|---|---|
| Dicalcium phosphate diyhdrate | 45.37 |
| Sodium bicarbonate | 15.10 |
| Wheat flour | 39.53 |

2. A non-shink binder material for addition to ground meat comprised of:

| | Parts by weight, pounds |
|---|---|
| Dicalcium phosphate diyhdrate | 45.37 |
| Sodium bicarbonate | 15.10 |
| Wheat flour | 27.80 |
| Non-fat dried milk solids | 10.73 |
| Hydrolyzed vegetable protein | 1.00 |

3. A non-shrink binder material for addition to ground meat comprised of:

| | Parts by weight, pounds |
|---|---|
| Dicalcium phosphate dihydrate | 43.57 |
| Monocalcium phosphate | 1.8 |
| Sodium bicarbonate | 15.1 |
| Wheat flour | 39.53 |

4. A non-shrink binder material for addition to ground meat comprised of:

| | Parts by weight, pounds |
|---|---|
| Dicalcium phosphate dihydrate | 43.57 |
| Monocalcium phosphate | 1.8 |
| Sodium bicarbonate | 15.10 |
| Wheat flour | 27.80 |
| Non-fat dried milk solids | 10.73 |
| Hydrolyzed vegetable protein | 1.00 |

5. A meat product comprised of a mixture of ground meat and a 3% to 6% by weight of a composition comprised of:

| | Parts by weight, pounds |
|---|---|
| Dicalcium phosphate dihydrate | 45.37 |
| Sodium bicarbonate | 15.10 |
| Wheat flour | 39.53 |

6. A meat product comprised of a mixture of ground meat and a 3% to 6% by weight of a composition comprised of:

| | Parts by weight, pounds |
|---|---|
| Dicalcium phosphate diyhdrate | 45.37 |
| Sodium bicarbonate | 15.10 |
| Wheat flour | 27.80 |
| Non-fat dried milk solids | 10.73 |
| Hydrolyzed vegetable protein | 1.00 |

7. A meat product comprised of a mixture of ground meat and a 3% to 6% by weight of a composition comprised of:

| | Parts by weight, pounds |
|---|---|
| Dicalcium phosphate diyhdrate | 45.37 |
| Monocalcium phosphate | 1.80 |
| Sodium bicarbonate | 15.10 |
| Wheat flour | 39.53 |

8. A meat product comprised of a mixture of ground meat and a 3% to 6% by weight of a composition comprised of:

| | Parts by weight, pounds |
|---|---|
| Dicalcium phosphate dihydrate | 43.57 |
| Monocalcium phosphate | 1.80 |
| Sodium bicarbonate | 15.10 |
| Wheat flour | 27.80 |
| Non-fat dried milk solids | 10.73 |
| Hydrolyzed vegetable protein | 1.00 |

9. A non-shrink binder material for addition to ground meat comprised of a mixture of dicalcium phosphate dihydrate, sodium bicarbonate and a colloidal binder material in the proportions of between one-third and one-half dicalcium phosphate dihydrate, between one-third and one-half colloidal binder material and between 10% and 20% of sodium bicarbonate.

10. A meat product comprising a mixture of ground meat with 3% to 6% by weight of a composition comprised of a mixture of dicalcium phosphate dihydrate, sodium bicarbonate and colloidal binder material in the proportions of between one-third and one-half dicalcium phosphate dihydrate, between one-third and one-half colloidal binder material, and between 10% and 20% sodium bicarbonate.

11. The composition called for in claim 9 with the addition of from 1% to 5% of vegetable protein.

12. The composition called for in claim 9 with the addition of from 1% to 5% of monocalcium phosphate.

13. The composition called for in claim 9 wherein the colloidal binder material is wheat flour and non-fat dry milk solids.

14. A non-shrink binder material for addition to ground meat comprised of a mixture of sodium aluminum phosphate, sodium bicarbonate and a colloidal binder material in the proportions of between one-third and one-half sodium aluminum phosphate, between one-third and one-half colloidal binder material, and between 10% and 20% of sodium bicarbonate.

15. A meat product comprising a mixture of ground meat with 3% to 6% by weight of a composition comprised of a mixture of sodium aluminum phosphate, sodium bicarbonate and a colloidal binder material in the proportions of between one-third and one-half sodium aluminum phosphate, between one-third and one-half colloidal binder material, and between 10% and 20% of sodium bicarbonate.

References Cited by the Examiner

UNITED STATES PATENTS

| | | | |
|---|---|---|---|
| 1,909,508 | 5/33 | Schick | 99—108 |
| 2,355,548 | 8/44 | Musher | 9—109 |
| 2,447,427 | 8/48 | Oftedahl | 99—108 |
| 2,635,963 | 4/53 | Glabe | 99—108 |
| 2,899,311 | 8/59 | Zick | 99—108 |
| 3,032,421 | 5/62 | Buchholz | 99—108 X |
| 3,100,710 | 8/63 | Carbin | 99—108 |

A. LOUIS MONACELL, *Primary Examiner.*

HYMAN LORD, *Examiner.*